Oct. 10, 1967

A. H. WILLIAMS ETAL 3,345,922

METHOD AND APPARATUS FOR WRAPPING CONTAINERS

Filed April 2, 1964

INVENTORS:
ALBERT HENRY WILLIAMS
REINHARDS VITOLS
LAURENCE WILLIAM TAYLOR
BY Howson & Howson
ATTYS.

INVENTORS:
ALBERT HENRY WILLIAMS
REINHARDS VITOLS
LAURENCE WILLIAM TAYLOR
BY Howson & Howson
ATTYS.

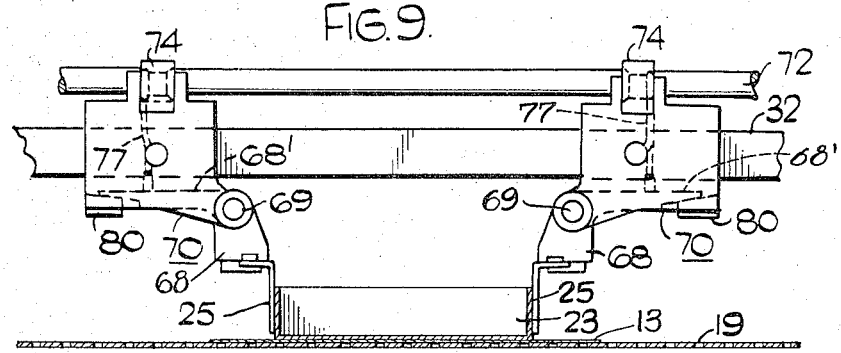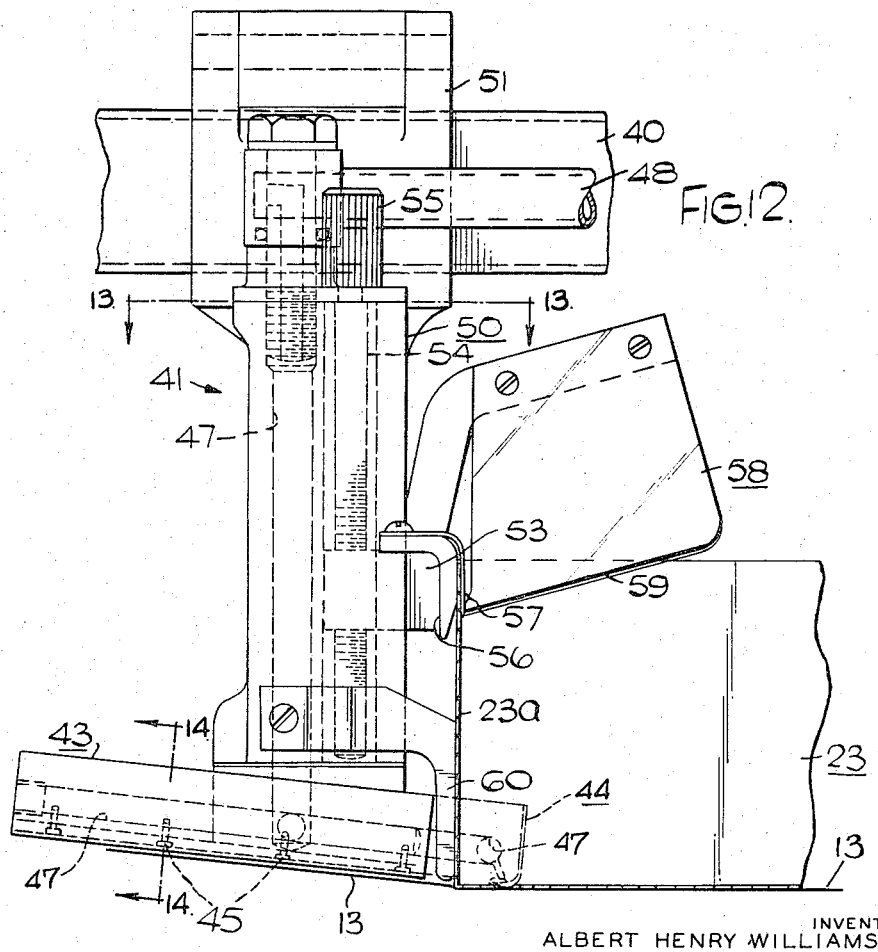

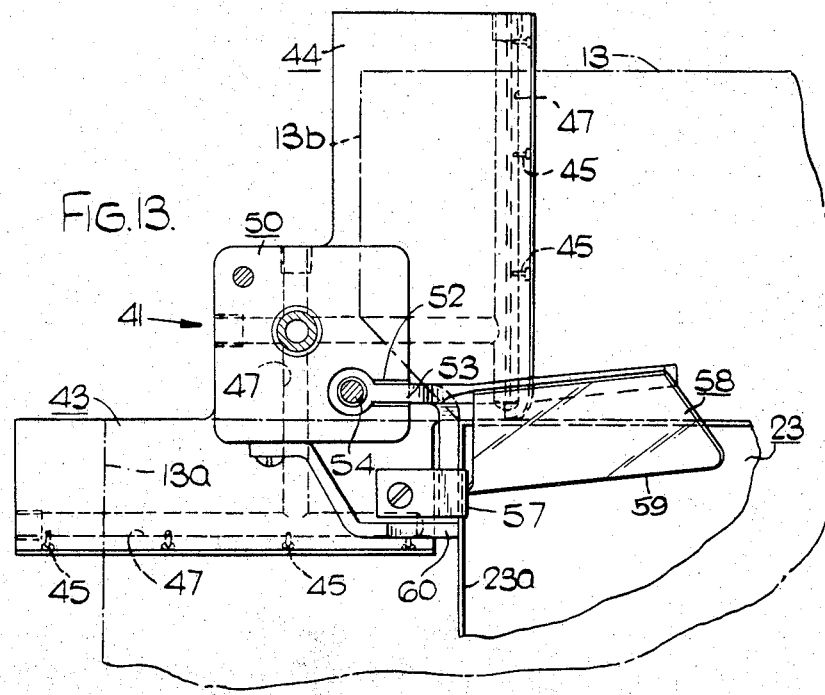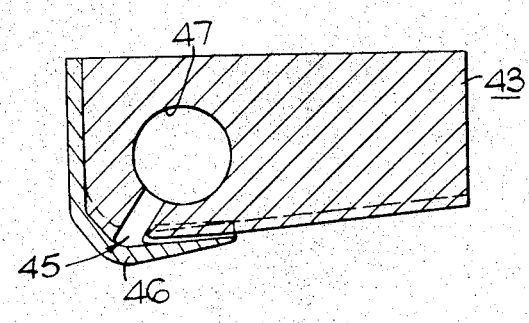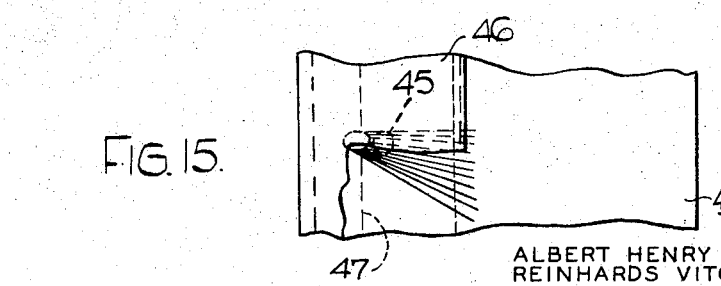

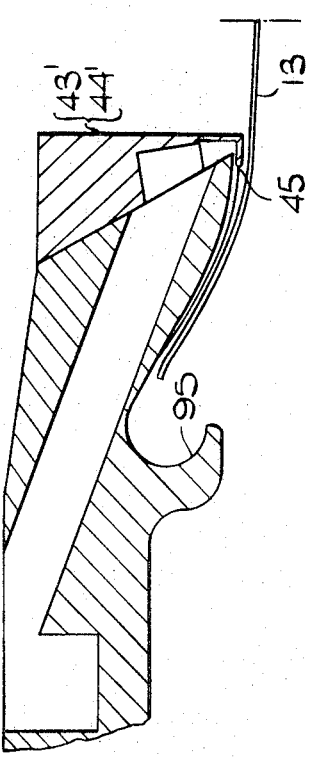
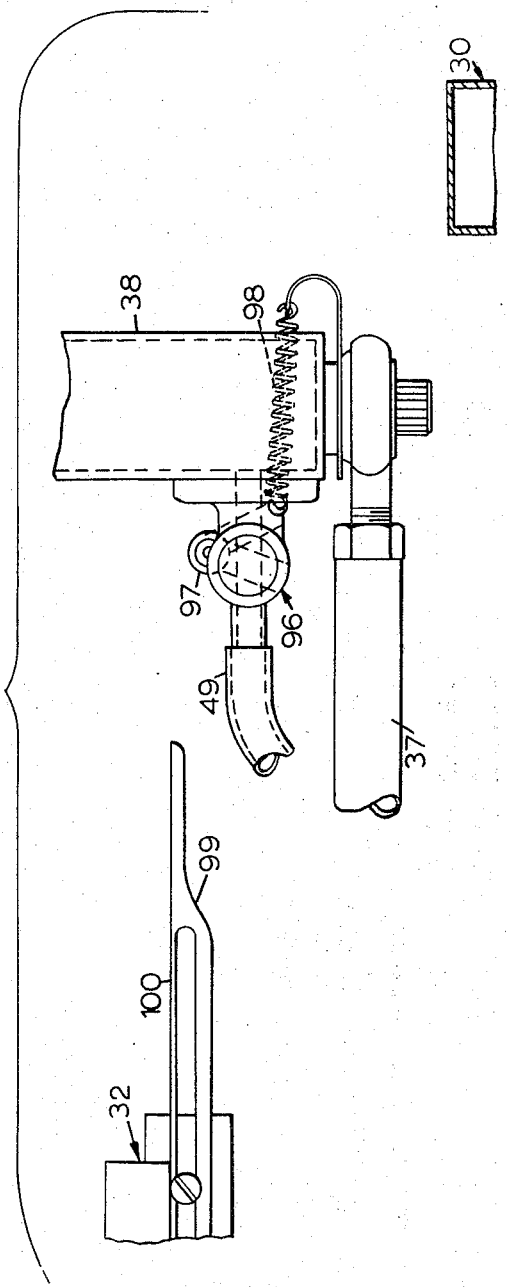
FIG. 16
FIG. 18

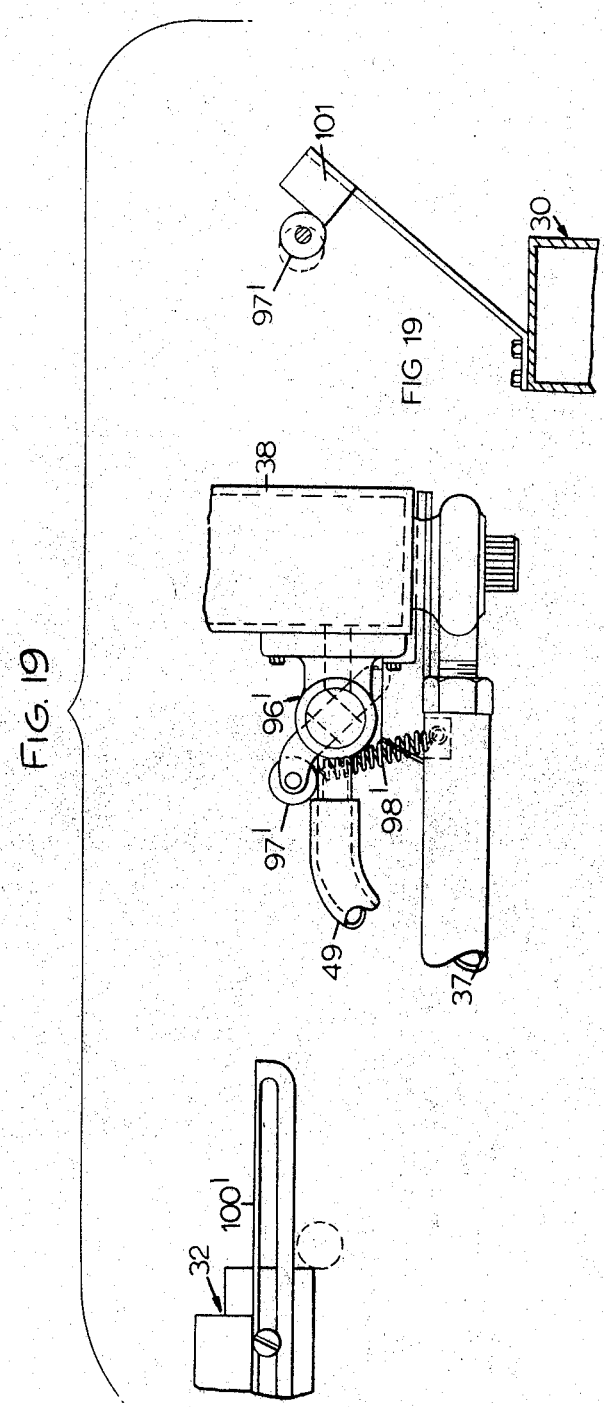

United States Patent Office 3,345,922
Patented Oct. 10, 1967

3,345,922
METHOD AND APPARATUS FOR
WRAPPING CONTAINERS
Albert Henry Williams, Stanton-on-the-Wolds, Nottinghamshire, Reinhards Vitols, New Basford, Nottingham, and Laurence William Taylor, Woodthorpe, Nottingham, England, assignors to Caledex Machine Co. Limited
Filed Apr. 2, 1964, Ser. No. 356,905
Claims priority, application Great Britain, Apr. 6, 1963, 13,771/63; May 29, 1963, 21,383/63
13 Claims. (Cl. 93—54)

This invention is an improved method of and means for connecting members. It provides a method of temporary connecting two members, one of which has at least one jet orifice at a surface to be presented to the surface of the other member, which comprises the steps of bringing said surfaces into close proximity and blowing a jet of air or other gas, (hereinafter referred to as air) through the jet and across the surface of the other member. This leads to the unexpected result that the two members are strongly attracted towards one another and it is thought that this is due to the fact that the air flow between the two surfaces also produces between them a region of low pressure whereby the two members are attracted. The method has a wide field of application, particularly to picking up and/or transporting said other member. Specifically, the said surface of the said other member may be an adhesive surface. The other member may be of sheet-like form, for example being constituted by a sheet of paper or similar material. A particular application of the invention is to the transportation of sheet material having an adhesively coated surface, for example to a wrapper to be wrapped round a box or lid (hereinafter referred to as a box).

The invention also includes apparatus for carrying out the above method.

The invention further provides a method for transferring sheet material from one station to another by the use of a transfer member movable between the two stations and having a surface for presentation in close proximity to the surface of the sheet material, wherein the sheet material is caused to be attracted to said surface of the transfer member by blowing a jet of air across the surface of the sheet material from a jet orifice in said surface of the transfer member.

The invention further includes apparatus for transferring sheet material from one station to another comprising a transfer member movable between the two stations and having a surface for presentation in close proximity to the surface of the sheet material, and means for causing the sheet material to be attracted to said surface of the transfer member comprising a jet orifice in said transfer member surface for blowing a jet of air across the surface of the sheet material. The transfer means may serve to transport the sheet material at least part way between the two stations. In this transfer, the sheet material may be supported by said attraction. Additionally, other supporting means may be caused to engage the opposite surface of the sheet material. Alternatively, the sheet material having been attracted towards the surface of the transfer member the air jet may be cut off and such other supporting means may be brought into operation.

Such other supporting means may be provided by one or more air jet orifices. The latter may blow air against, or across, or against and also across, the said opposite surface of the sheet material. Thus there may be at least one additional jet orifice arranged to blow air against said opposite surface and in a direction towards the said surface of the transfer member. Such additional jet orifice or orifices may be provided in a stationary part of the apparatus.

Alternatively or in addition to blowing air against said opposite surface, the first said air jet may be caused to reverse its direction, after travelling across the surface of the sheet material, to travel across the opposite surface thereof.

There may be deflector means for so deflecting the jet of air emanating from the jet orifice of the aforesaid transfer member that said air jet, after travelling across the surface of the sheet material, is deflected so as to travel in the reverse direction across the opposite surface of the sheet material to support the latter. This deflector means may be provided on the transfer member.

A specific application of the invention is to box making apparatus of the kind wherein successive wrappers, having their upper surfaces coated with adhesive, are carried along in spaced relation by the upper lap of a conveyor towards a transfer station and prior to arrival thereat each has a box or blank for a box placed on its upper surface with margins of the wrapper protruding beyond the box or blank; at the transfer station the box or blank is engaged by a transfer mechanism and is transferred thereby with the adhered wrapper at least part way to a box-forming station whereat tools operate to wrap the wrapper round the box and if necessary to erect the latter from the blank. It is desirable that in the initial stages of the transfer the leading part of the wrapper shall be lifted clear or held clear of the surface of the conveyor and shall be supported during subsequent stages of the transfer. The present invention may be employed to achieve this object.

In order that the invention may be better understood reference will now be made to the accompanying drawings in which:

FIGURES 1 to 6 illustrate rudimentary forms of jet apparatus according to the invention, while FIGURES 7 to 15 illustrate transfer apparatus, incorporating the invention, for box making machines. In FIGURES 7 to 15:

FIGURE 7 is a sectional elevation showing the principal parts of the transfer apparatus and its relation to a box-making machine.

FIGURE 8 is an end elevation thereof with certain parts removed for the sake of clarity.

FIGURE 9 is a detail.

FIGURE 10 is a view similar to FIG. 1 but showing the transfer apparatus at a different stage of its operation.

FIGURE 11 is a plan view.

FIGURES 12 and 13 are respectively an elevation and plan, on a larger scale, of a portion of the transfer apparatus.

FIGURE 14 is a section, on a larger scale, taken through the line A—A in FIG. 12.

FIGURE 15 is an inverted view of the parts shown in FIG. 14.

FIGURE 16 is a sectional view of a modified jet block.

FIGURES 18 and 19 illustrate alternative air valve arrangements that may be employed for controlling the air jets.

Figure 1:
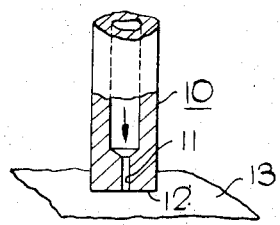

In FIG. 1 there is shown a member 10 having a central jet orifice 11 in an end surface 12 which is to be brought into close proximity to the surface of a second member 13, such as a sheet of paper or the like. If air at high pressure is blown through the jet orifice 11 then as the member 10 is moved into close surface proximity to the sheet 13 the emerging jet of air is caused to fan out radially in the narrow gap between the two surfaces. This has the unexpected result that the sheet 13 is attracted towards the member 10 and is lifted. It is thought that this effect is due to the formation, at the 'eye' of the outwardly flowing jet, of a zone of low pressure so that in effect the sheet 13 is attracted upwards. Intimate contact between sheet 13 and the surface 12 is prevented by the outflowing layer of air. Obviously if member 12 is moved, it will transport sheet 13 with it. It is considered that the surface of sheet 13 should be relatively smooth and should be relatively impervious to air flow.

Figure 2:
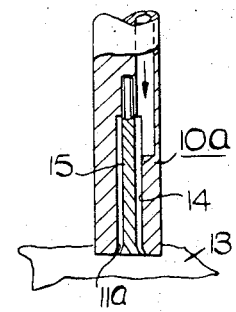

In FIG. 2 the member 10a is provided with a jet orifice 11a of out-turned annular form produced by chamfering the end of central hole 14 and inserting in it a mushroom headed member 15.

Figure 3:
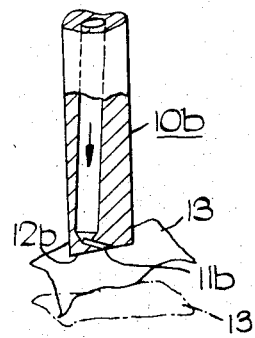

In FIG. 3 member 10b has an obliquely directed jet orifice 11b which may be a simple hole or a slot extending at right angles to the plane of the drawing. Under surface 12b of member 10b is oblique. The angle of the orifice 11b causes air jet to flow in one direction across the surface of sheet 13 and it is considered that a zone of low pressure will be formed rearwards of the jet orifice, thereby attracting sheet 13 towards surface 12b. The unidirectional air-flow also tends to blow the sheet 13 along and in fact may be employed to cause transport of the sheet. The obliquity of surface 12b assists in tilting the sheet upwards as shown.

Figure 4:
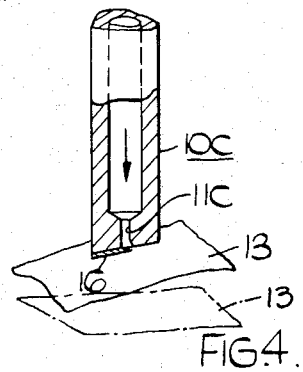

In FIG. 4 the jet orifice 11c in member 10c is chamfered and is partly overlapped by a plate 16 so that the air jet fans out in one direction as a flat stream.

Figure 5:
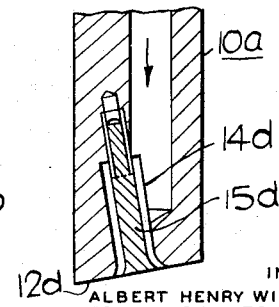

FIG. 5 shows a modification of the construction as shown in FIG. 2. The jet hole 14d in member 10d is oblique, as is also the mushroom headed member 15d and the under surface 12d.

Figure 6:
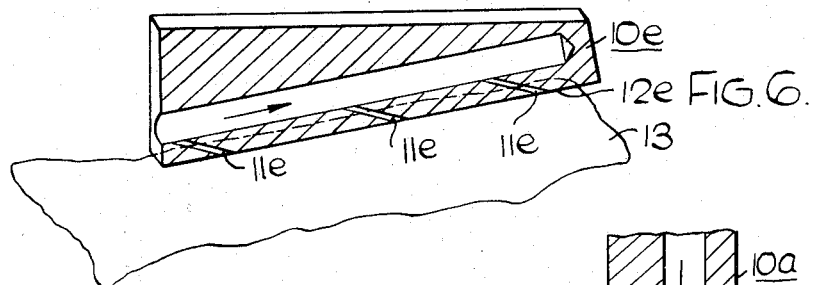

In FIG. 6 member 10e having an oblique under surface 12e is provided with a plurality of oblique jet orifices 11e. A zone of low pressure is formed rearwards of each jet orifice. The leading edge of the sheet 13 is lifted and the sheet is also impelled to move in the direction of the jets.

Figure 10:
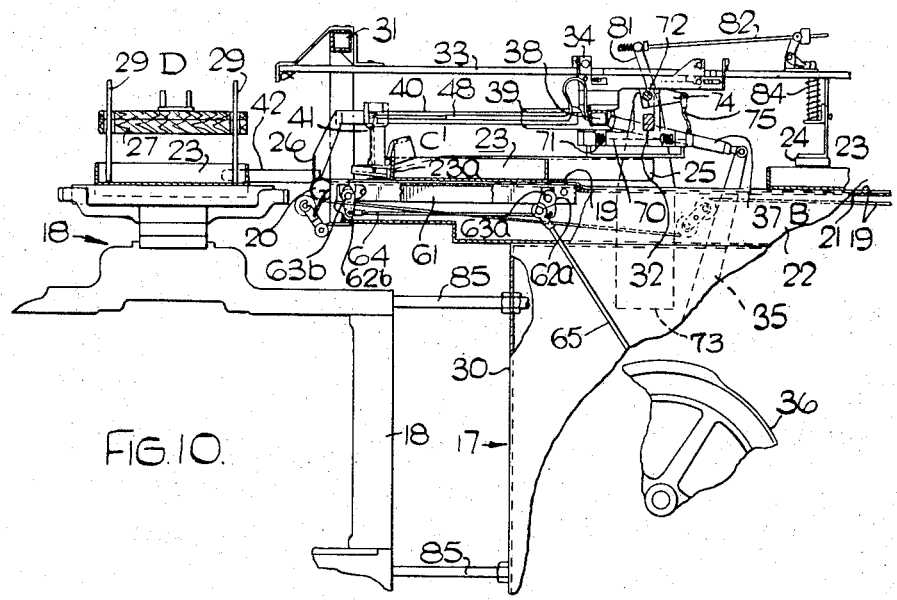
Figure 11:
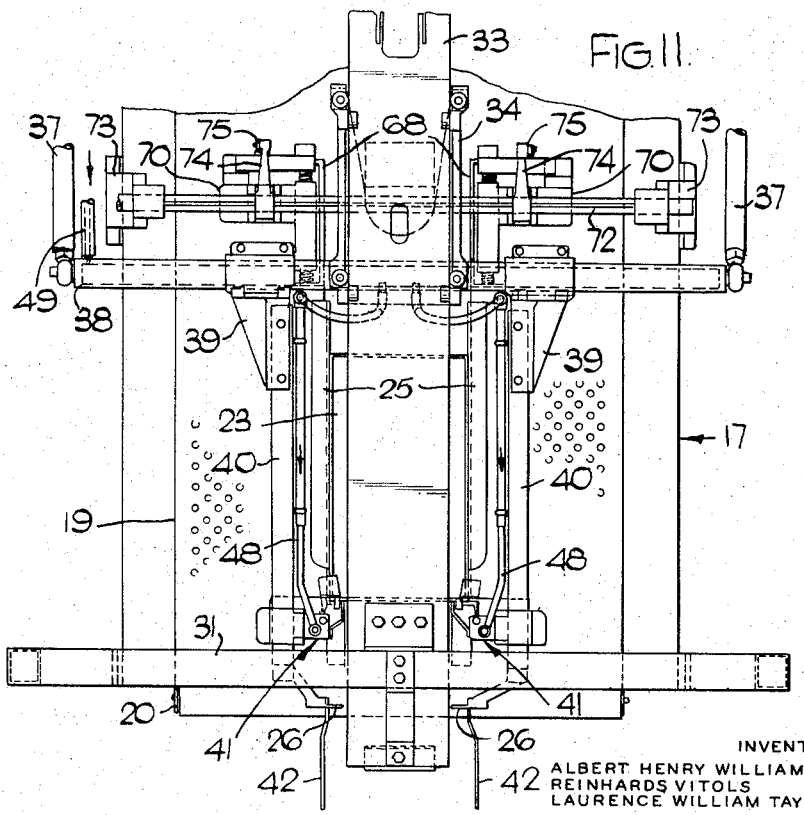

Turning now to FIGS. 7 to 15 the transfer apparatus is constructed as a unit 17 and the box-making machine or apparatus which it feeds is constructed as a unit indicated at 18 (FIG. 10).

Figure 7:
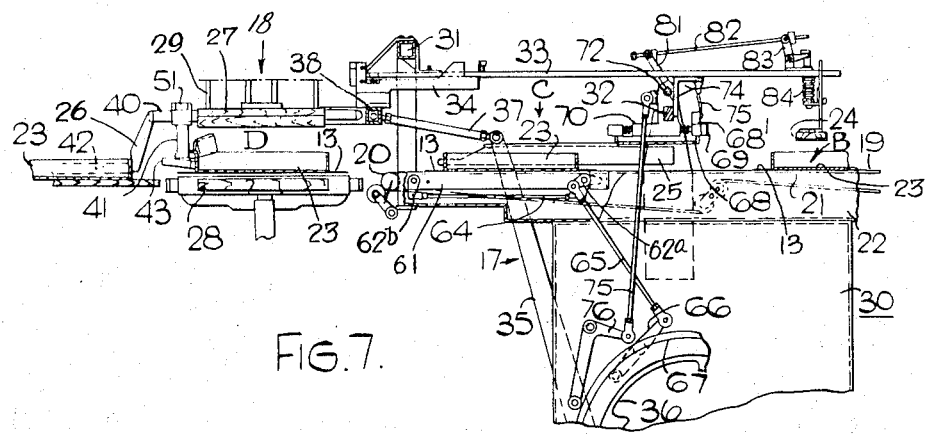
Figure 8:
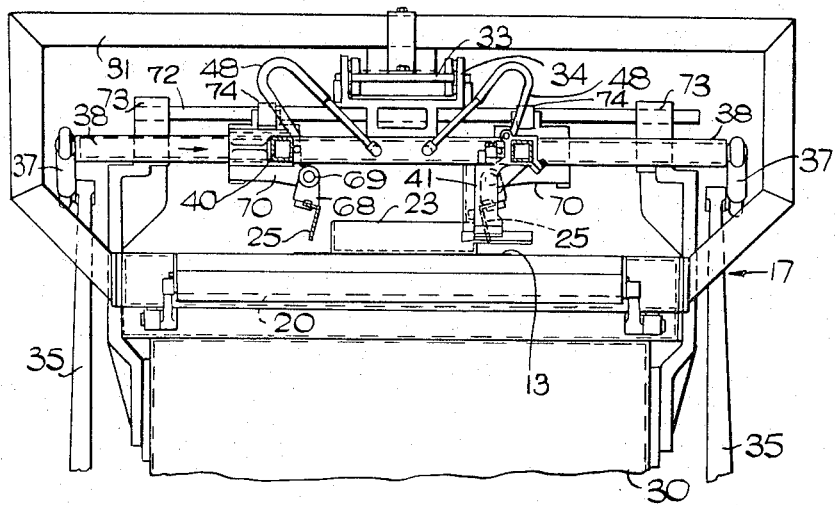
Figure 17A:
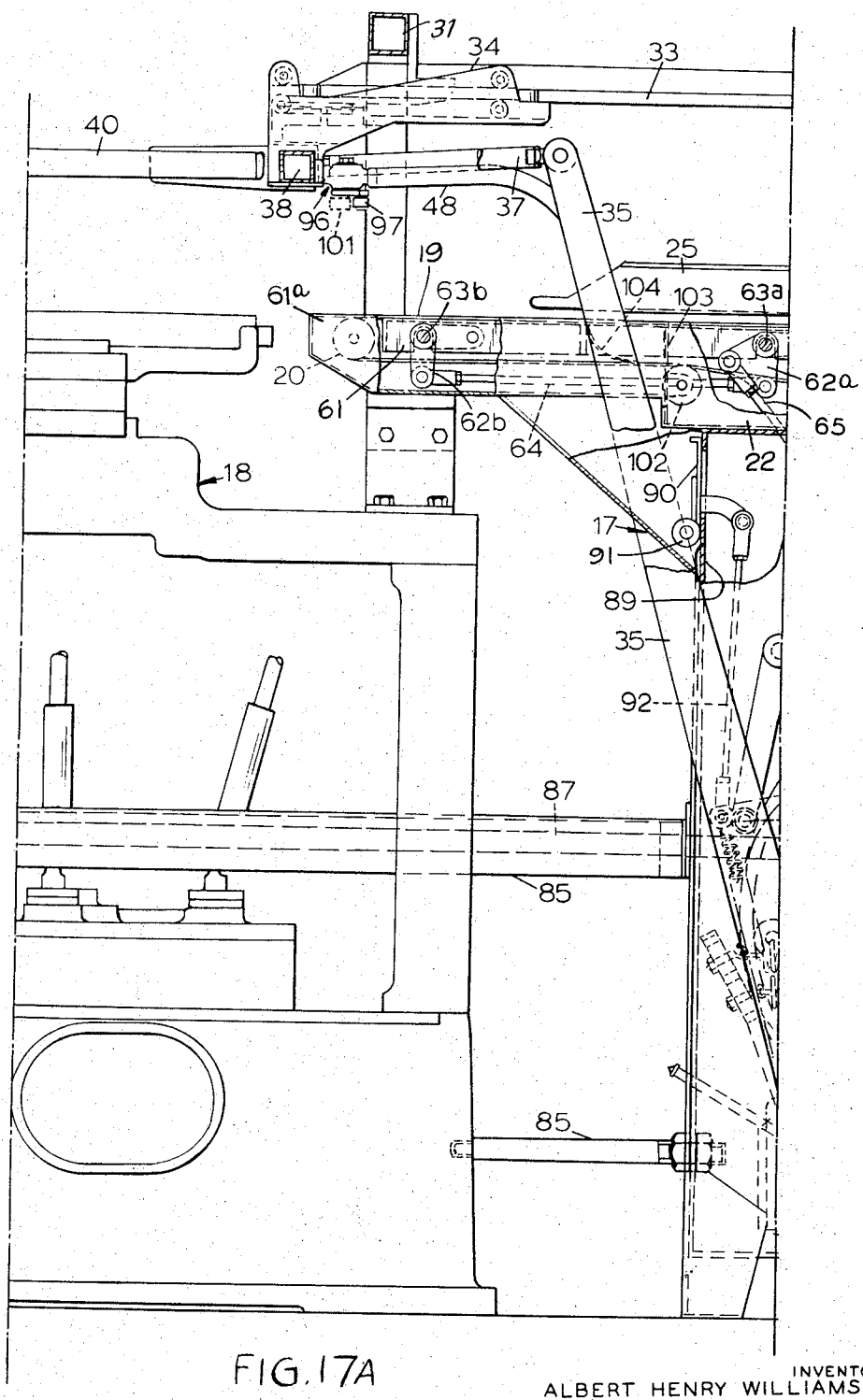
FIGURES 17a and 17b are side elevational views partially in section of a machine according to FIGS. 7–16, but incorporating certain modifications.
Figure 17B:
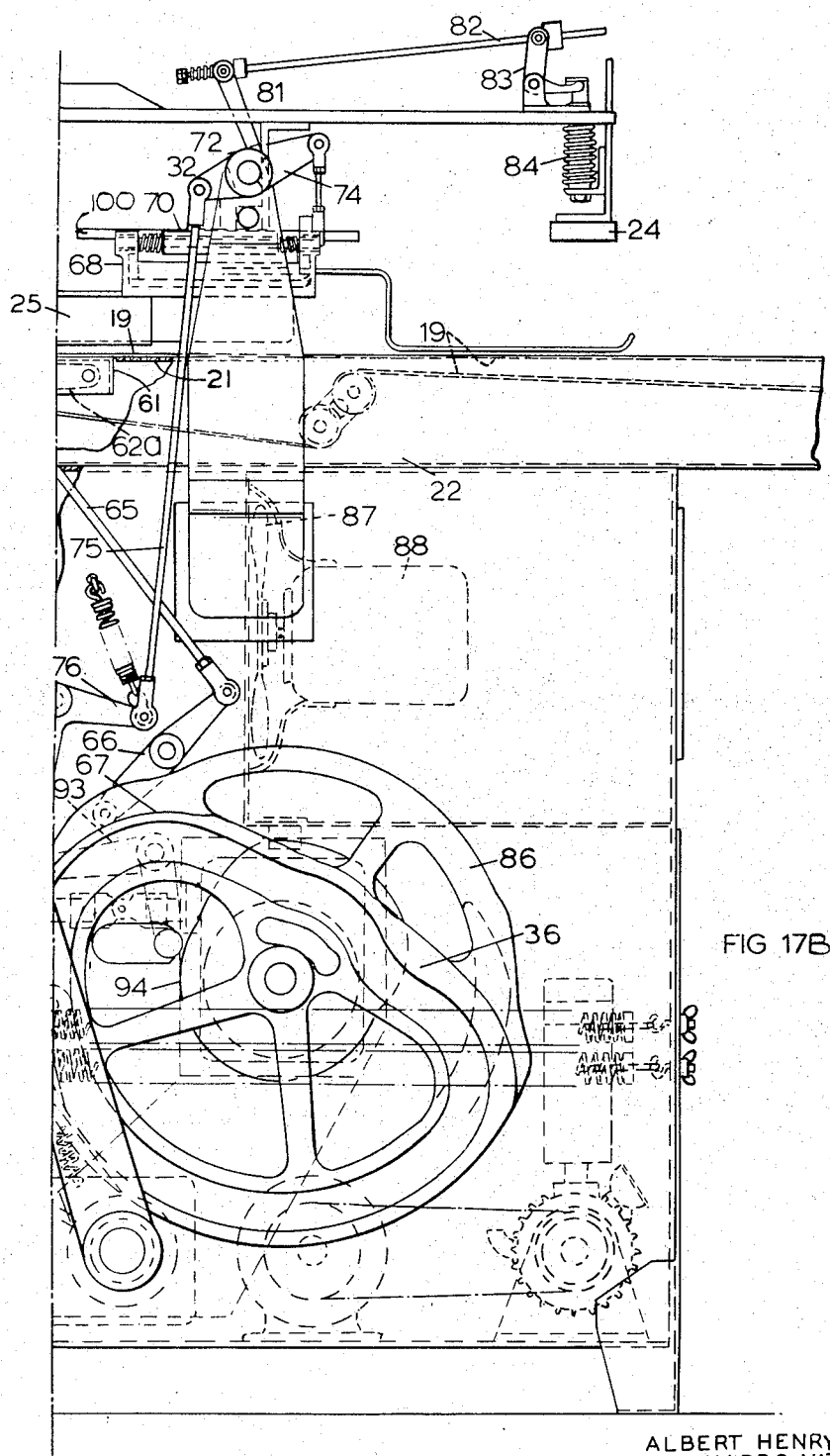

The apparatus 17 comprises an endless belt conveyor 19 travelling in a horizontal top lap from right to left in FIGS. 7 and 10 between end rollers (one of which is shown at 20) and over a support plate 21 forming the top of a box-like enclosure 22 from which air is exhausted by any suitable pump, such for example as the fan 87 driven by motor 88 in FIG. 17. Plate 21 is perforated and so is belt 19.

At the right hand end of the conveyor, wrappers 13 having their upper surfaces coated with adhesive are supplied to the conveyor by any suitable gluing mechanism or manually. The suction exerted in the box 22 holds these wrappers flat on the upper lap. They are disposed centrally in the width of the upper lap and at spaced intervals along its length. The conveyor travels intermittently, being driven by any suitable mechanism. Its pauses may be produced automatically or under the control of an operator.

At each pause one of the wrappers is presented at a station occupied by an operator who places a box 23 symmetrically on its upper surface. At a subsequent pause it is presented at station B in FIG. 7 where a tamper 24 descends to engage the bottom of the box and to press it down on the wrapper. At a further pause the box is presented at station C between side gauges 25 which close together to locate the box centrally of the conveyor lap and to hold it. Thereafter the box is pulled back to station C' by retiring transfer mechanism hereinafter described and on the advancing stroke of this mechanism it is pushed to station D in the box-forming apparatus 18. In this movement pushers 26 discharge from station D a previously wrapped box as shown on the left of FIG. 7.

The box-forming apparatus 18 is of well known character and requires no detailed description herein; it comprises a form block 27 which descends into the box 23 and pushes the latter, with its wrapper, down between form-tools which apply the wrapper around the sides of the box. The form block 27 rises and the wrapped box is brought up by plunger 28, being stripped from the form block 27 by strippers 29.

The transfer apparatus 17 comprises a frame structure 30 having overhead cross members 31, 32 which support a single central guide rail 33. The latter supports part of the operating mechanism for the tamper 24, and a reciprocatable carriage 34. Carriage 34 is reciprocated by side levers 35 oscillated by cam 36 (see also FIG. 17) and connected by links 37 to opposite ends of a hollow cross member 38 on the carriage.

Clamped to cross member 38 so as to be individually adjustable along it for spacing, there are brackets 39 carrying forwardly protruding horizontal transfer arms 40. Each of these carries at its forward end a device 41 by which, as hereinafter described, the leading wall 23a of the box 23 is gripped and by which the air jets to lift the leading margin of the wrapper 13 are supplied. Each bar 40 also carries one of the pushers 26 aforesaid and a guide 42, these guides being arranged to pass on either side of the wrapped box prior to the discharge of the latter from station D. Devices 41 are adjustable lengthwise of their bars 40 in accordance with the length of boxes being dealt with; each comprises a body 50 clamped to bar 40 by clamp 51.

The body 50 of each device 41 supports at its lower end jet blocks 43, 44 arranged in L formation as shown in FIG. 13 to correspond with the shape of the forward corner of wrapper 13 which is cut to the contour shown in chain dotted lines. Thus block 43 is arranged to lift and support the outer margins of the front flap 13a of the wrapper and block 44 is arranged to lift and support the front margin of the outer flap 13b of the wrapper. The under surface of each block slopes forwards and upwards as shown in FIG. 12 and outwards and upwards as shown in FIG. 14.

Each block 43, 44 is provided at its under surface with jet orifices indicated generally at 45. The orifices in block 43 blow air outwards and those in block 44 blow air forwards. As shown in FIGS. 14 and 15 the orifices are overlapped by plate members 46 so as to direct the air jets in flat streams along the under surface of block 43 or 44.

These air jets operate to cause parts 13a, 13b of the wrapper to be lifted from the surface of conveyor 19 in the manner described. Air at high pressure is supplied to the jet orifices by conduits 47 (FIGS. 12, 13, 14) connected by pipes 48 (FIGS. 8, 11 and 12) to the hollow cross member 38 which is supplied by pipe 49 FIG. 11, from any suitable source of pressure air.

The supply of air to the jet orifices at the appropriate times is controlled by an suitable valve mechanism, and two suitable forms are hereinafter described with reference to FIG. 18 and 19.

Body 50 of each device 41 is formed with a guideway 52 (FIGS. 12 and 13) in which a member 53 is vertically adjustable by screw 54 with knurled head 55. Member 53 carries a deflector 56, a co-operating gripper plate 57 and a guide plate 58 of springy sheet metal having an inclined lower edge 59. Also secured to body 50 there is a pusher 60 for engaging the leading wall 23a of the box 23 as hereinafter described.

As the transfer mechanism is retired by arms 35 to bring the devices 41 from station D towards station C, the pushers 60 engage the leading wall 23a of the box 23 presented at station C and push the box rearwards between the closed side gauges 25 into station C'. In so doing the top edge of the leading wall 23a is engaged by the lower edges 59 of guide plates 58, thus ensuring that should the box be twisted the top edge of the leading wall is brought to the level of the lower margins of gripper means consisting of spring grippers or clips 57. At or about this stage the rear or delivery end of the conveyor belt 19 is raised to raise the box so that the leading wall 23a is inserted between the grippers 57 and the deflectors 56 as shown in FIG. 12. Also at or about this time the air pressure is applied to the jet orifices so that parts 13a, 13b of the wrapper are lifted, from the conveyor, towards the under surfaces of block 43, 44. The prevailing conditions may be such that the adhesive surface of the wrapper does not make contact, or any appreciable contact, with the blocks. Thereupon the delivery end of the belt 19 is lowered, the travel of the belt recommenced, and the transfer mechanism is moved by levers 35 to push the box with the supported wrapper from station C' to station D.

Air pressure may be supplied to the jet orifices to support parts 13a, 13b of the wrapper, before or after or at the same time as the transfer mechanism commences to move and the travel of the belt is recommenced.

Immediately prior to the conveyor belt commencing to move the side gauges 25 are opened and the tamper 24 is raised from the box presented at station B.

The delivery end of the belt conveyor, including the roller 20, is carried by an inverted tray structure 61 mounted on levers 62a, 62b pivoted at 63a, 63b. These levers are connected by link 64, and lever 62a is connected by link 65 to the lever 66 operated by track 67 on cam 36.

Each side gauge 25 is mounted for lengthwise adjustment on a bracket 68 pivoted at 69 on a bracket 70. Brackets 70 are individually adjustable along the cross bar 32 to accommodate boxes of different widths and each gauge 25 is biased towards the closed position by springs 71. Above the brackets 70 there is the cross spindle 72 mounted at 73 and carrying a lever 74 for each bracket, these levers being adjustable along the cross spindle with the brackets. Spindle 72 is rocked through tie rod 75 from the bell crank lever 76 operated by the periphery of a cam such as cam 36 or cam 86 of FIG. 17. Each lever 74 is linked by tie rod 77 to an arm 68' protruding from bracket 68. Thus by operation of lever 76 the side gauges 25 are opened and permitted to close. Their closed position is adjustably determined by ramps 80 adjustably secured to the brackets 70, on which ramps the ends of arm 68' rest.

Additionally, cross spindle 72 carries an arm 81 connected by tie rod 82 to a bell crank lever 83 mounted on the end of guide 33. Movement of this bell crank lever in the anti-clockwise direction, FIGS. 7 and 10, serves to raise the tamper 24 against the action of a return spring 84. Thus the movements of the side gauges 25 and the tamper 24 are effected in timed relation with one another and with the movements of the discharge end of the conveyor belt and of the transfer mechanism under the control of cam 36.

It will be appreciated that the movement of the box and wrapper from station C' to station D is in direct linear continuation of the movement of the box and wrapper along the conveyor 19.

It has been stated that the transfer apparatus 17 and the box-forming apparatus 18 are constructed as separate units. They are connected in the desired relationship by connections 85, FIGS. 10 and 17, and they may be driven by a common source of power, such for example as an electric motor built into unit 18 and driving unit 17 through a horizontal shaft shown at 87 in FIG. 17.

In the example described the leading part of the wrapper may be supported, by reason of the effect of the air jets, throughout its whole path of movement from station C to station D. If desired, however, mechanical means may be provided for insertion under the forward part of the wrapper, subsequent to said forward part having been lifted by the air jets, to support it during a portion or the whole of said path. For example the transfer mechanism may incorporate fingers which, after said part of the wrapper has been lifted by the action of the jets, are moved in beneath it to support it thereafter the air jets being then, or at any suitable subsequent phase, cut off.

The apparatus shown in FIGS. 7–15 is shown in greater detail in FIG. 17 to which reference is directed. FIG. 17 also illustrates certain modifications. The air exhausted from the box 22 is sucked through the perforations in the upper lap of the conveyor belt 19 and is passed into a compartment 89 which communicates, by means of a flap valve 90, with the box-like member 61a which contains the roller 20 for the forward end of the belt and the upper surface of which supports said forward end. Appropriate means, indicated at 102, 103, and 104, are provided for adequately sealing box member 61 where the bottom lap of the belt passes out of it. The flap valve 90 is opened at the appropriate time to admit air under pressure to the box-like member 61a. If the upper surface of member 61a is perforated at desired locations, then an air current through the perforations in the leading end of the belt and against the underside of the wrapper is thereby produced. Alternatively, or in addition, the upward air current may pass between the roller 20 and the forward end of the box member 61a. At this region there may be a slot in the top of the box member or a series of orifices in the latter. The flap valve 90 may be opened at any appropriate time and may continue open until the leading end of the wrapper has passed beyond the delivery end of the conveyor belt. The flap valve is pivoted at 91 and is connected by a link to a bell crank lever 93 operated by a cam 94.

It is preferred that the jet orifices in the jet blocks 43, 44 should not be brought into operation until after the leading panel of the wrapper 13 has passed from the delivery end of the belt conveyor 19. The expression "leading panel" is employed to include at least that flap which is designated 13a in FIG. 13. It may also include those parts of the wrapper which, in FIG. 13, are located under the jet blocks 44. This delay in bringing the jet orifices 45 into action is possible because the transfer from station C' to station D' is in direct continuation of the transport of the wrappers and their applied boxes by the belt conveyor 19.

A modified construction for the jet blocks is illustrated at 43', 44' in FIG. 16. Either or each of these jet blocks has, at a location spaced from the jet orifices 45, a deflector 95 forming a re-entrant curve which deflects the air jets (issuing from these orifices and passing over the upper surface of the wrapper 13) rearwards beneath the wrapper. The arrangement is such that when the box and its applied wrapper have been lifted towards the under surface of blocks 43', 44' by upward movement of the delivery end of the conveyor belt (assisted if necessary by the action of the additional air jets blowing against the underside of the wrapper) the wrapper is lifted upwards by the action of the air jets issuing from orifices 45 as already described and the upper surface of the wrapper deflects the last-mentioned air jets upwards along the convex under surface of the block so that they impinge on the deflector 95 and are again deflected backwards beneath the wrapper to provide additional support for the latter. This last-mentioned arrangement may be adopted even if the jet orifices 45 are brought into action before the leading part of the wrapper leaves the conveyor belt 19.

FIGS. 18 and 19 show alternative ways of controlling the supply of air from pipe 49 to the interior of cross member 38 and thence to the jet orifices 45.

In FIG. 18 there is an air valve indicated generally at 96 having an operating member 97 which is biased by a spring 98 towards the valve open position. As the cross member 38 retires from station D towards station C, member 97 engages a ramp 99 on a cam bar 100 so that the valve is closed. Conversely as the cross member 38 again moves forward in the transport of a box and its applied wrapper towards station D, member 97 eventually disengages from the ramp 99 and valve 96 is opened by spring 98. It will be seen that in this arrangement the jets 45 are not brought into operation until some time subsequent to the commencement of the transport of a box from station C towards station D. Cam bar 100 is adjustably mounted on frame 32 for adjustment lengthwise of the direction of movement of the box so as to adjust the timing of the opening and closing of valve 96.

In the alternative arrangement illustrated in FIG. 19, valve 96' has an operating member 97' which is biased towards the valve closed and the valve open attitude by the toggle action of spring 98'. During the forward movement of cross member 38 to transport a box towards station D the valve is in the open position and towards the end of said forward movement operating member 97' engages a stationary trip member 101 which knocks the valve over to the valve closed position. Therefore as the cross member 38 retires towards station C the valve remains closed. At a predetermined stage in this movement the valve operating member 97' engages the stationary cam bar 100' and so the valve is knocked over to the valve open position, in which it remains during the subsequent forward travel of member 38.

While the invention has been described herein with reference to apparatus in which an erected box 23 is applied to each wrapper 13 carried by the conveyor 19 it will be appreciated that the transfer apparatus is applicable to apparatus in which a blank for a box is applied to each wrapper, the blank being formed into a box and the wrapper wrapped round its sides by suitable tools of known form in the unit 18.

What we claim is:

1. A method of transferring a box and a sheet of adhesively coated material between two stations by a transfer member movable between said two stations, said sheet material at least partially adhesively attached to said box whereby at least part of said material projects outwardly therefrom, towards the second of said stations, adhesive side up; comprising the steps of: gripping said box and bringing an undersurface of the transfer member into close proximity with at least a portion of said projecting adhesive surface at one of said stations; blowing a film of air through the gap formed between said surfaces and directing the film in an outward direction toward the marginal edge of said sheet thereby supporting said portion of said sheet while simultaneously preventing said adhesives from contacting said undersurface; moving the transfer member to transfer the sheet and said box towards the other of said stations, and during said movement blowing said film of air through said gap to thereby support said portion of said projecting adhesive sheet without contact between said surfaces.

2. A method in accordance with claim 1 including the step of supporting the sheet at its underside by reversing the air flow direction at the marginal edge of the sheet and blowing said air along the underside of the sheet.

3. A method in accordance with claim 1 wherein said adhesive surface also projects outwardly of said box from opposite longitudinal sides of said box; including the steps of: bringing another undersurface of said transfer member into close proximity with at least a portion of said adhesive surface projecting outwardly from opposite longitudinal sides of said box, directing an air film towards the marginal edge of at least one of said sides to support said side and tension said sheet without contact between said surfaces.

4. A method in accordance with claim 1 wherein said transfer member commences movement between said stations prior to the blowing of said film of air between said surfaces.

5. A method in accordance with claim 1 including the step of elevating said box and said partially attached sheet material towards said transfer member to grip said box.

6. A method in accordance with claim 1 including the step of supporting said sheet material on the surface thereof opposite said adhesive surface as said box and said sheet material are moving towards said second station.

7. A method in accordance with claim 6 wherein said additional support of said sheet material includes the step of blowing air to impinge upon said surface opposite said adhesive surface.

8. In a box wrapping machine having a foraminous conveyor with a suction box therebelow and means for applying a suction thereto; said conveyor adapted to carry successive sheets of wrapping material, said material having an upwardly facing adhesive surface for receiving boxes thereon with marginal edge portions of said material projecting outwardly therefrom; transfer means for moving said box and wrapping material from said conveyor to a wrapping station, said transfer means comprising: a body having at least one jet block extending outwardly from said body towards said wrapping station and connected to said body, said block including an undersurface, facing said conveyor, said surface being forwardly and upwardly sloped and adapted to overlie at least one marginal edge portion of said material projecting from said box; a plurality of jet orifices in said undersurface, means to direct air emitting from said orifices in an outwardly direction and in flat streams along said forwardly and upwardly sloped undersurface whereby said marginal edge portion of said sheet material, adjacent said surface, is attracted to said surface and held in substantially spaced relation; and gripper means associated with said body for engaging a wall of said box, and means for reciprocating said body and said gripper means between said conveyor and said wrapping station.

9. Apparatus in accordance with claim 8 including means for raising at least a portion of said conveyor at the position wherein said transfer means overlies said conveyor to thereby position said wrapper in close proximity to said body and jet block.

10. Apparatus in accordance with claim 8 including means to reciprocate said transfer means between said conveyor and said wrapping station.

11. Apparatus in accordance with claim 8 including a second body and jet block, said second jet block including an undersurface facing said conveyor, said surface being forwardly and upwardly sloped and adapted to overlie at least one other marginal edge portion of said material projecting from said box; a plurality of jet orifices in said second undersurface, means to direct air emitting from said orifice in an outwardly direction and in flat streams along said forwardly and upwardly sloped undersurface whereby said other marginal edge portion of said sheet material, adjacent said second undersurface, is attracted to said surface and held in substantially spaced relation.

12. Apparatus in accordance with claim 8 including a second jet block connected to said body and positioned at substantially right angles to said first block, said second block having a plurality of jet orifices in an undersurface thereof, facing said conveyor; means to direct air emitting from said orifices in an outwardly direction and in flat streams along said undersurface whereby another marginal edge portion of said sheet material, adjacent said surface, is attracted thereto and held in substantially spaced relation.

13. Apparatus in accordance with claim 8 wherein said jet block is of sufficient length and is positioned so as to extend beyond the terminal edge of said marginal edge portions of said material, and a deflector connected to said jet block adapted to route the air egressing from between said surfaces so as to impinge upon the undersurface of said marginal edge.

References Cited

UNITED STATES PATENTS

| 2,953,371 | 9/1960 | Smith | 271—26 |
| 2,958,267 | 11/1960 | Wolff et al. | 93—54 |
| 2,961,931 | 11/1960 | Von Hofe et al. | 93—54 |
| 3,126,200 | 3/1964 | Rehm | 271—26 |

FOREIGN PATENTS

| 1,060,874 | 7/1959 | Germany. |
| 1,065,430 | 9/1959 | Germany. |

BERNARD STICKNEY, *Primary Examiner.*